United States Patent
Zhang

(10) Patent No.: US 8,511,198 B2
(45) Date of Patent: Aug. 20, 2013

(54) ROBOT ARM SYSTEM

(75) Inventor: Guo-Qing Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 229 days.

(21) Appl. No.: 13/087,376

(22) Filed: Apr. 15, 2011

(65) Prior Publication Data

US 2012/0048047 A1   Mar. 1, 2012

(30) Foreign Application Priority Data

Aug. 25, 2010  (CN) .......................... 2010 1 0262489

(51) Int. Cl.
    *B25J 17/00* (2006.01)
(52) U.S. Cl.
    USPC ................ 74/490.04; 74/490.05; 74/665 GE; 901/21; 901/25
(58) Field of Classification Search
    USPC ............... 74/490.01, 490.02, 490.03, 490.04, 74/490.05, 37, 89.2, 665 GE; 901/15, 21, 901/25
    See application file for complete search history.

(56) References Cited

U.S. PATENT DOCUMENTS

| | | | | |
|---|---|---|---|---|
| 4,259,876 A | * | 4/1981 | Belyanin et al. | 74/469 |
| 4,531,884 A | * | 7/1985 | Russell | 414/729 |
| 4,603,511 A | * | 8/1986 | Komatsu et al. | 451/11 |
| 4,620,831 A | * | 11/1986 | Poncet et al. | 414/744.3 |
| 5,274,213 A | * | 12/1993 | Sartorio | 219/125.1 |
| 5,388,480 A | * | 2/1995 | Townsend | 74/501.5 R |
| 5,740,602 A | * | 4/1998 | Peterson et al. | 29/748 |
| 6,144,180 A | * | 11/2000 | Chen et al. | 318/587 |
| 6,357,310 B1 | * | 3/2002 | Blanchet et al. | 74/89.21 |
| 6,648,588 B2 | * | 11/2003 | Shanmugasundram et al. | 414/806 |
| 7,021,173 B2 | * | 4/2006 | Stoianovici et al. | 74/490.05 |

FOREIGN PATENT DOCUMENTS

| | | |
|---|---|---|
| CN | 1666854 A | 9/2005 |
| CN | 101022928 A | 8/2007 |

* cited by examiner

*Primary Examiner* — David M Fenstermacher
(74) *Attorney, Agent, or Firm* — Altis Law Group, Inc.

(57) ABSTRACT

A robot arm system includes a support base, a first robot arm, a first driving mechanism, a second robot arm, a second driving mechanism, and a wrist assembly. The first driving mechanism drives the first robot arm to rotate around the first rotation axis. The second driving mechanism drives the second robot arm to rotate around the second rotation axis. The robot arm system further comprises a first wheel positioned on the support base, a second wheel positioned on the second robot arm, a third wheel positioned on the wrist assembly and rotatably connecting to the second robot arm, a first flexible belt connecting the first wheel with the second wheel, and a second flexible belt connecting the third wheel with the second wheel. The first wheel, the second wheel, and the third wheel have the same radius.

19 Claims, 5 Drawing Sheets

ROBOT ARM SYSTEM

BACKGROUND

1. Technical Field

The present disclosure relates to robots and, more particularly, to a robot arm having several rotation axes.

2. Description of Related Art

Robots that are being used for packing or transferring products include a wrist assembly at an end thereof and one or more quadrilateral linkage assemblies for controlling movement of the wrist assembly. The wrist assembly can move in a level plane via the quadrilateral linkage assemblies.

The first quadrilateral linkage assembly is connected to a first support base, and the second quadrilateral linkage assembly is connected to a second support base. The third quadrilateral linkage assembly is connected to the first quadrilateral linkage assembly and the second quadrilateral linkage assembly. The wrist assembly is fixed on the third quadrilateral linkage assembly and moves in the level plane. However, the robot has a complex structure and correspondingly has a large size.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
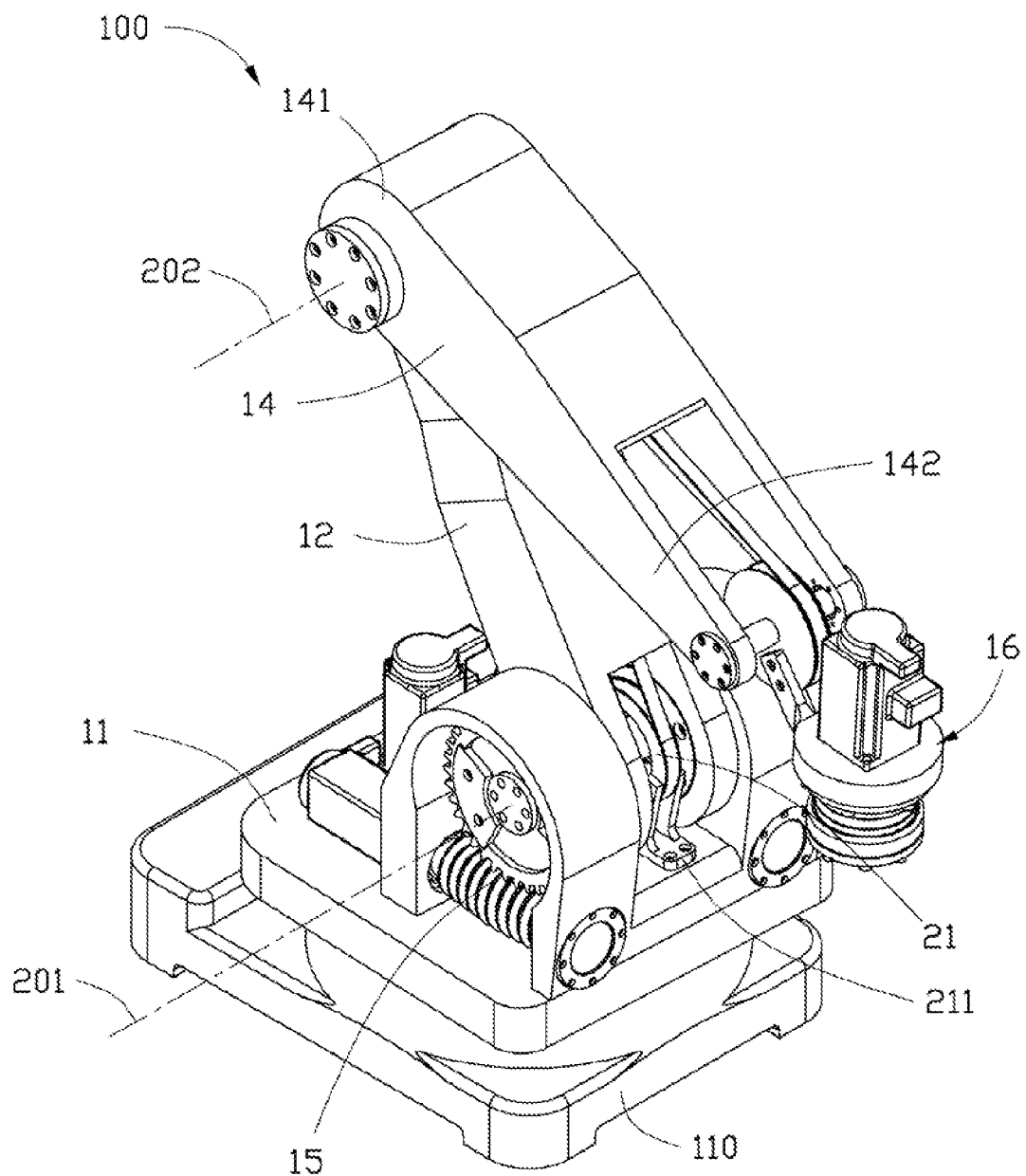
FIG. 1 is an isometric view of an embodiment of a robot arm system.
Figure 2:
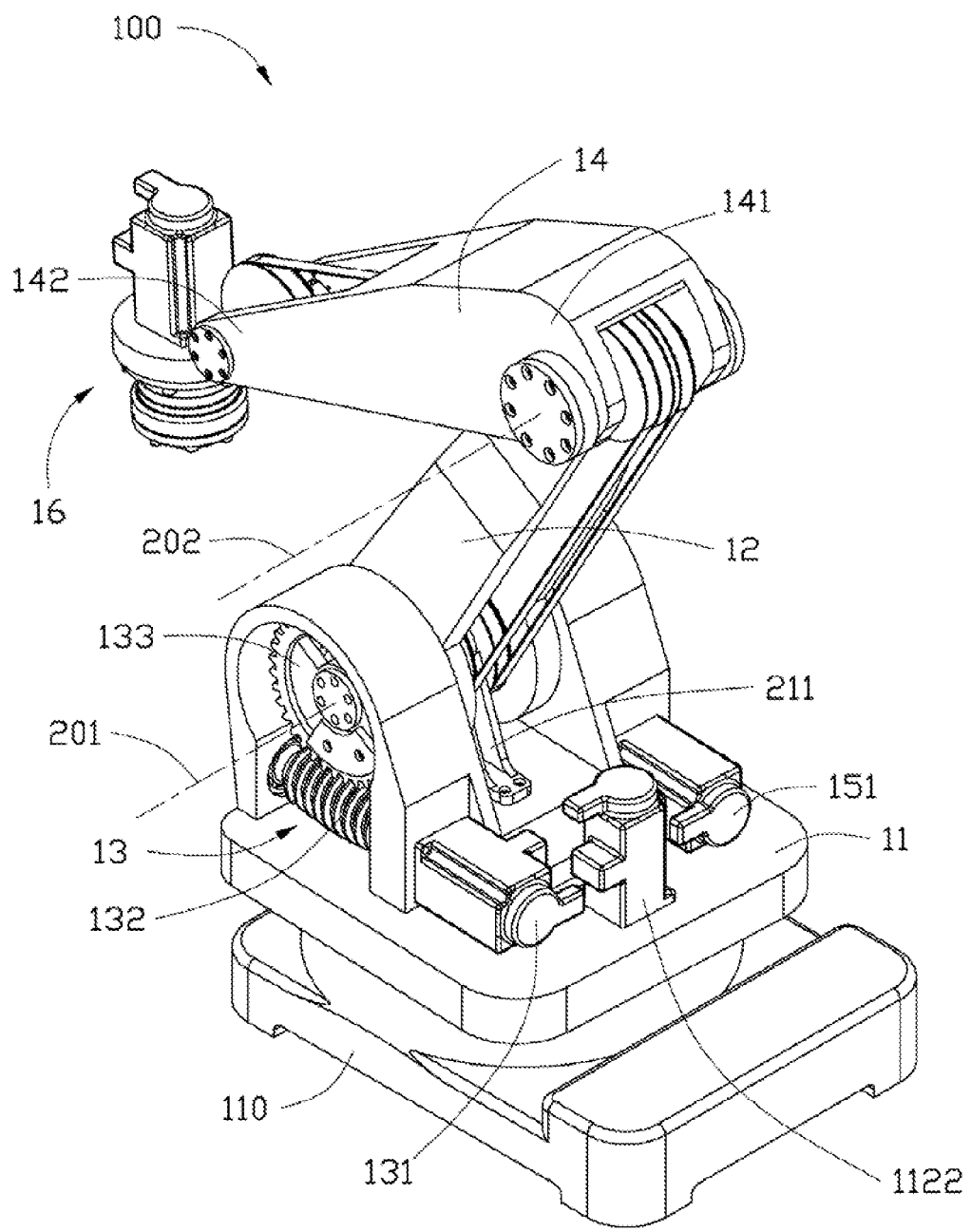
FIG. 2 is similar to FIG. 1, but shown in another state.

Referring to FIGS. 1 and 2, an embodiment of a robot arm system 100 includes a support base 11, a first robot arm 12, a first drive mechanism 13, a second robot arm 14, a second drive mechanism 15, and a wrist assembly 16. The first robot arm 12 is rotatably connected to the support base 11, and the second robot arm 14 is rotatably connected to the first robot arm 12. The first drive mechanism 13 drives the first robot arm 12 to move, and the second drive mechanism 15 drives the second robot arm 14 to move. The first robot arm 12 rotates about a first rotation axis 201, and the second robot arm 14 rotates about a second rotation axis 202. The second robot arm 14 has a first end 141 and a second end 142. The first end 141 is connected to the first robot arm 12, and the second end 142 is connected to the wrist assembly 16.

Figure 3:
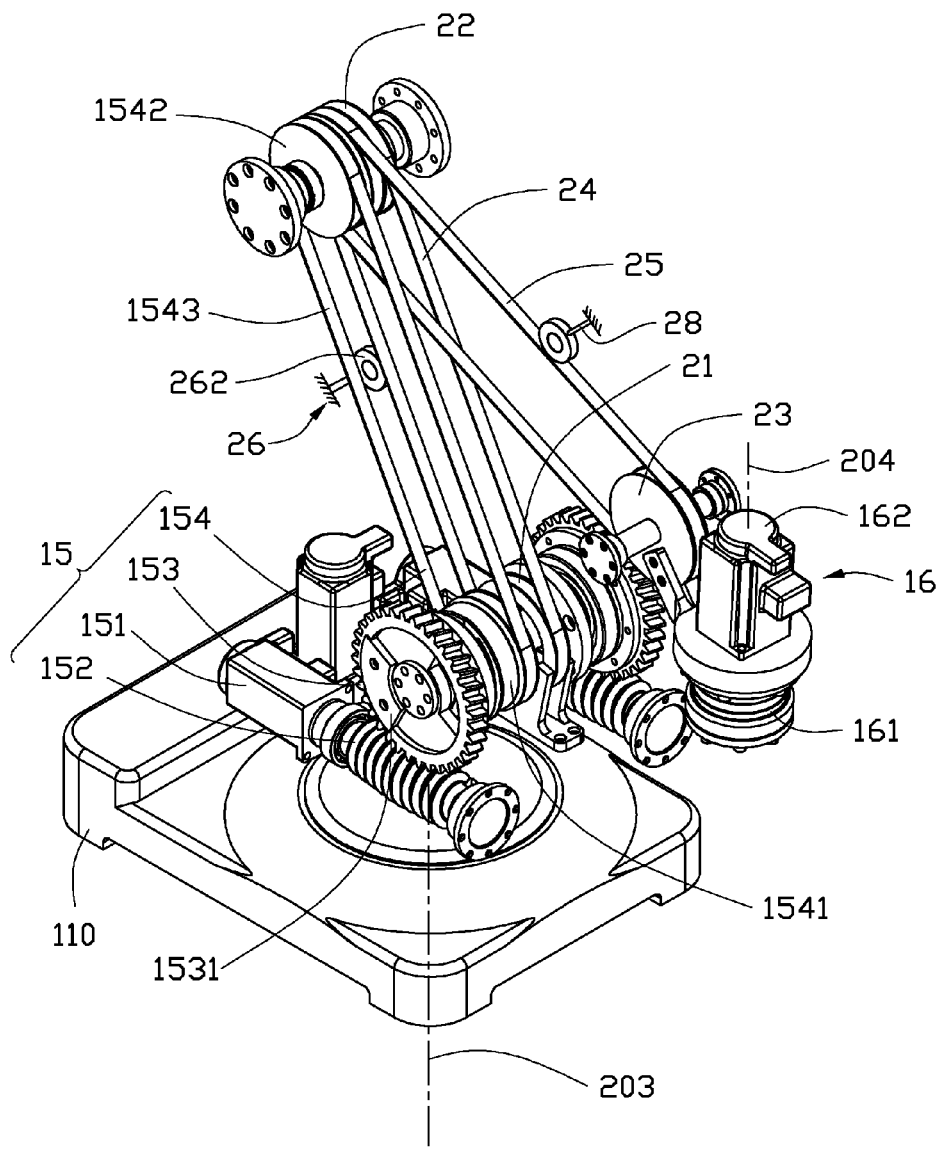
FIG. 3 is a partial, isometric view of the robot arm system of FIG. 1.
Figure 4:
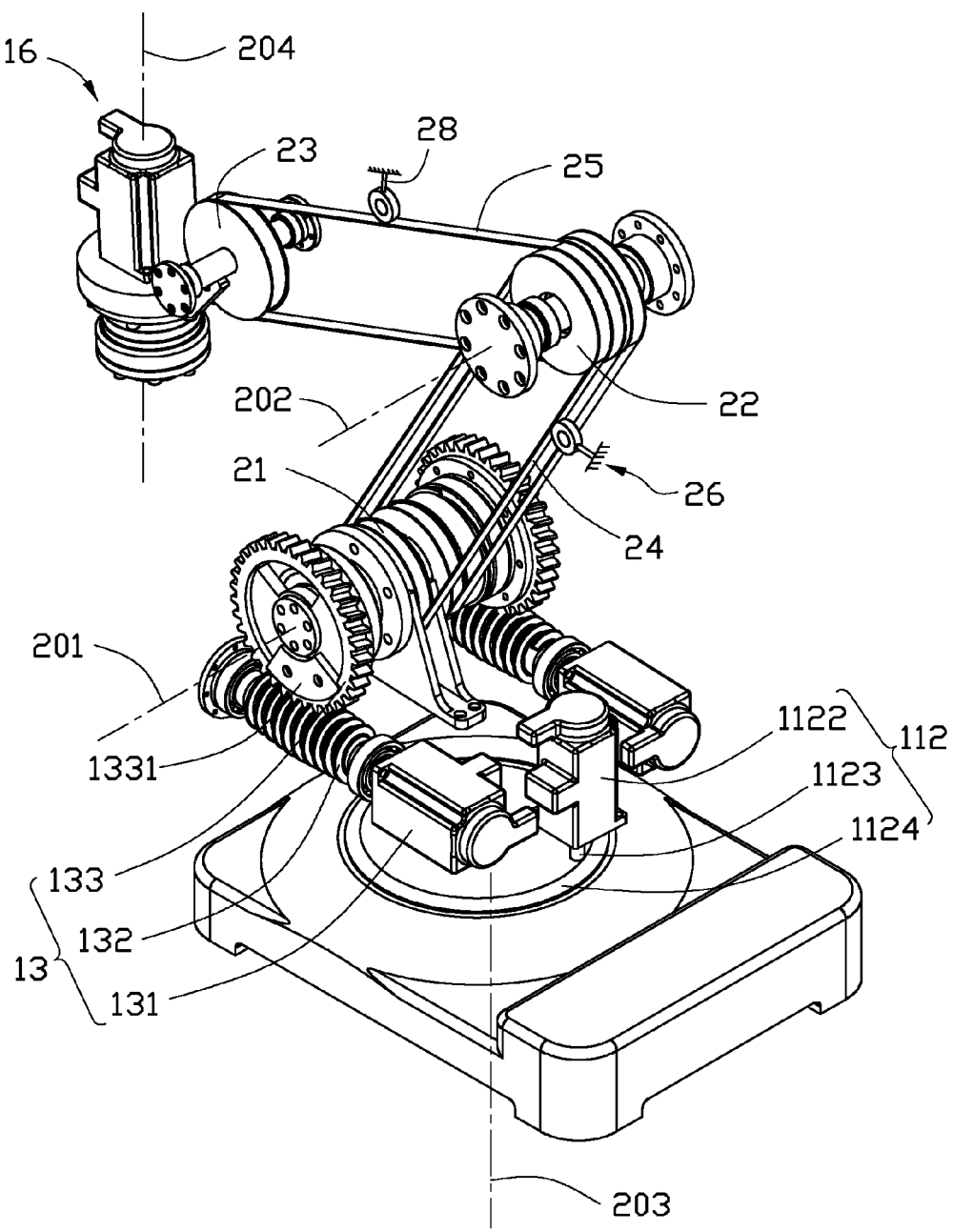
FIG. 4 is similar to FIG. 3, but shown in another state.

Referring to FIGS. 3 and 4, the robot arm system 100 further includes a first wheel 21, a second wheel 22, and a third wheel 23, a first flexible belt 24, and a second flexible belt 25. The first wheel 21 is positioned on the support base 11 via an amounting base 211 (shown in FIG. 2), and the second wheel 22 is positioned on the first end 141 of the second robot arm 14. The third wheel 23 is positioned on the wrist assembly 16, and rotatably connected to the second end 142 of the second robot arm 14. The first flexible belt 24 is sleeved on the first wheel 21 and the second wheel 22. The second flexible belt 25 is sleeved on the second wheel 22 and the third wheel 23. The first wheel 21, second wheel 22, and third wheel 23 have the same radius. A central axis of the first wheel 21 is aligned with the first rotation axis 201 in a straight line, and a central axis of the second wheel 22 is aligned with the second rotation axis 202 in a straight line.

Figure 5:
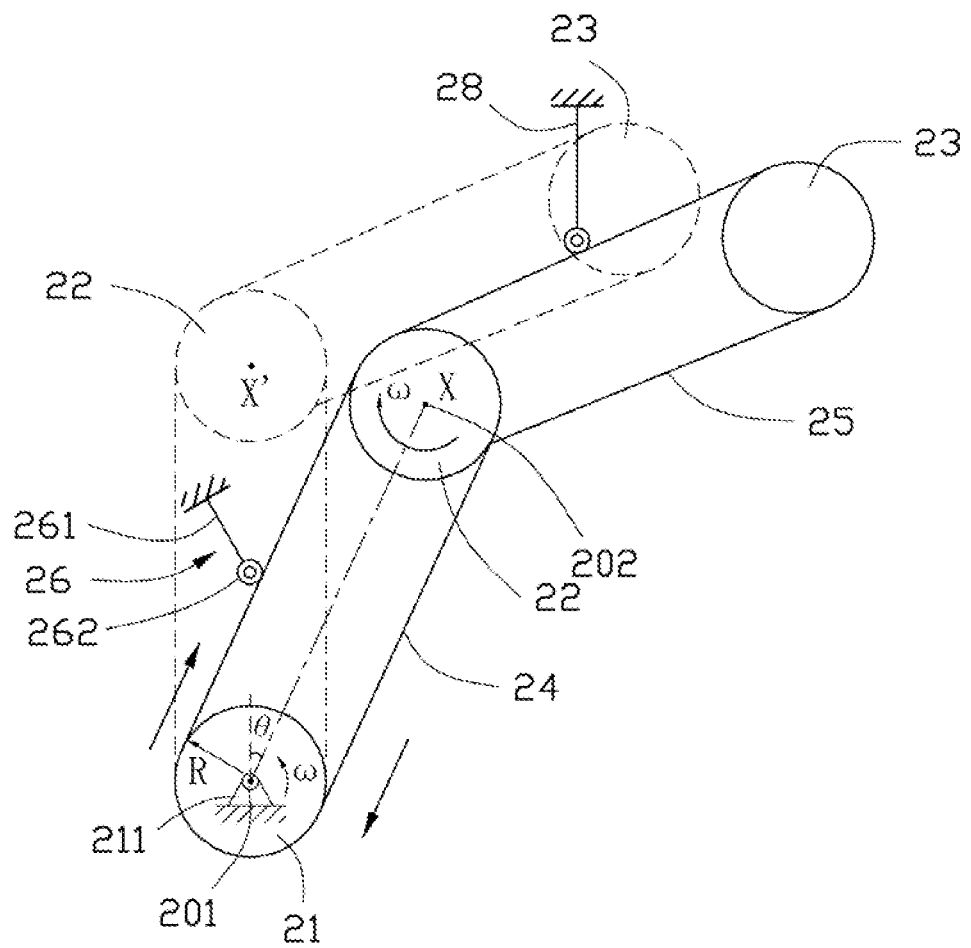
FIG. 5 is a schematic view of the robot arm system of FIG. 1 in a rotating process.

Referring to FIG. 5, one embodiment of a working process of the robot arm system 100 is described as follows. In the embodiment, the radius of the first wheel 21, the second wheel 22, and the third wheel 23 are substantially the same and represented by R. The first drive mechanism 13 drives the first robot arm 12 to rotate counterclockwise at an angular velocity ω relative to the first rotation axis 201, from a first position (as shown in solid lines in FIG. 5) to a second position (as shown in dotted lines in FIG. 5), through an angle θ. The first flexible belt 24 at the left side moves towards the second wheel 22 a length of θR, and the right of the first flexible belt 24 moves towards the first wheel 21 a length of θR. That is, the first flexible belt 24 rotates the length of θR. As a result, the second wheel 22 is transferred from a position X to a position X'. The second wheel 22 rotates clockwise relative to a central axis thereof, when the second wheel 22 rotates relative to the first rotation axis 201 following the first robot arm 12, because the first wheel 21 and the second wheel 22 have the same radius R. A relative angular velocity of the second wheel 22 relative to the first wheel 21 is zero, because the first flexible belt 24 rotates counterclockwise at the angular velocity ω relative to the first wheel 21, and the second wheel 22 rotates clockwise at the angular velocity ω relative to the first flexible belt 24. That is, an attitude of the second wheel 22 is not changed in a rotating process of the first robot arm 12. Therefore, an attitude of the second robot arm 14 does not change when the first robot arm 12 rotates relative to the first rotation axis 201.

As described above, because the third wheel 23 has the same radius as the second wheel 22, an attitude of the third wheel 23 together with the wrist assembly 16 does not change when the second drive mechanism 15 drives the second robot arm 14 to rotate relative to the second rotation axis 202. Thus, an attitude of a workpiece (not shown) clutched by the wrist assembly 16 cannot be changed during a rotating process of the first robot arm 12 and the second robot arm 14, which is convenient for packing or transferring products. In the illustrated embodiment, the first flexible belt 24 and the second flexible belt 25 may be a synchronous belt, steel rope, or flat belt.

The robot arm system 100 has the first flexible belt 24 connecting the second wheel 22 to the first wheel 21, and the second flexible belt 25 connecting the second wheel 22 to the third wheel 23. Thus, an attitude of the wrist assembly 16 positioned on the third wheel 23 cannot change during the rotating process of the first robot arm 12 and the second robot arm 14. In addition, the robot arm system 100 has a compact structure with several components, thereby occupying less space.

Referring to FIGS. 3 through 5 again, the robot arm system 100 further comprises a first pre-tighten assembly 26 and a second pre-tighten assembly 28. The first pre-tighten assembly 26 includes a pressure wheel 261 and a support pole 262 connecting with the pressure wheel 261. The pressure wheel 261 presses on the first flexible belt 24 to tighten any slack. The second pre-tighten assembly 28 has a same structure as the pre-tighten assembly 26, and presses on the second flexible belt 25 to tighten any slack.

Referring again to FIGS. 1 through 4, in the illustrated embodiment, the first drive mechanism 13 includes a first motor 131, a first worm 132, and a first worm gear 133. The first motor 131 is positioned on the support base 11 and drives the first worm 132 to rotate. The first worm 132 meshes with the first worm gear 133, thereby driving the first robot arm 12 to rotate relative to the first rotation axis 201. The first worm gear 133 has a first torque adjusting portion 1331, used to offset the effect of a load torque of the robot arm system 100. The first torque adjusting portion 1331 is a protrusion formed on the first worm gear 133 offset from the first rotation axis 201, which is able to generate a torque from rotational inertia thereof when rotating around the first rotation axis 201, thereby balancing a torque generated by the first robot arm 12. An amount of torque generated by the first torque adjusting portion 1331 can be adjusted by rotating the first worm gear 133. The first torque adjusting portion 1331 deviates the center of gravity of the first worm gear 133, to offset the effect of the greater load torque. The first torque adjusting portion 1331 may be made of high density materials, such as lead.

The second drive mechanism 15 includes a second motor 151, a second worm 152, a second worm gear 153, a belt transmission assembly 154. The second motor 151 is positioned on the support base 11 and drives the second worm 152 to rotate. The second worm 152 meshes with the second worm gear 153. The belt transmission assembly 154 connects the second worm gear 153 to the second worm 152, thereby driving the second robot arm 14 to rotate around the second rotation axis 202. The belt transmission assembly 154 includes a driving wheel 1541, an action wheel 1542, and a transmission belt 1543 connecting the driving wheel 1541 with the action wheel 1542. The driving wheel 1541 is meshed with the second worm gear 153, and the action wheel 1542 is positioned on the second robot arm 14. The second worm gear 153 also has a second torque adjusting portion 1531. The second torque adjusting portion 1531 is a protrusion formed on the second worm gear 153 offset from the first rotation axis 201 which is able to generate a torque from rotational inertia thereof when rotating around the first rotation axis 201, thereby balancing a torque generated by the second robot arm 14. An amount of torque of the second torque adjusting portion 1531 can be adjusted by rotating the second worm gear 153.

The first drive mechanism 13 and the second drive mechanism 15 use worm-worm gear structure for the power transmission, which can self-lock more easily, so the whole body of the robot arm system 100 is more compact. It should be understood that, the first drive mechanism 13 and the second drive mechanism 15 are not limited to use a worm-worm gear structure for power transmission, but can also use reducers for power transmission.

It should be appreciated that the support base 11 can be rotatably positioned on a bottom base 110. A third drive mechanism 112 drives the support base 11 to rotate around a third rotation axis 203 relative to the bottom base 110. The third drive mechanism 112 includes a third motor 112, a first gear 1123, and a second gear 1124. The first gear 1123 is meshed with the second gear 1124, and the third motor 112 drives the first gear 1123 to rotate, thereby driving the support base 11 to rotate around the third rotation axis 203. In addition, the wrist assembly 16 further comprises a rotation shaft 161, and a fourth motor 162 for driving the rotation shaft 161 to rotate around a fourth rotation axis 204. Thus, the wrist assembly 16 can rotate around a fourth rotation axis 204 when the wrist assembly 16 moves in a level plane.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A robot arm system, comprising:
a support base;
a first robot arm rotatably connected to the support base;
a first drive mechanism driving the first robot arm to rotate around a first rotation axis relative to the support base;
a second robot arm rotatably connected to the first robot arm;
a second drive mechanism driving the second robot arm to rotate around a second rotation axis relative to the first robot arm;
a wrist assembly connected to the second robot arm;
a first wheel positioned on the support base;
a second wheel positioned on the second robot arm;
a third wheel positioned on the wrist assembly and rotatably connected to the second robot arm;
a first flexible belt connecting the first wheel with the second wheel; and
a second flexible belt connecting the third wheel with the second wheel, wherein the first wheel, the second wheel, and the third wheel have a substantially same radius, the first wheel is driven by the first drive mechanism to rotate, an attitude of the second robot arm remains unchanged when the first robot arm rotates relative to the first rotation axis.

2. The robot arm system of claim 1, further comprising a first pre-tighten assembly pressing against the first flexible belt.

3. The robot arm system of claim 2, wherein the first pre-tighten assembly comprises a pressure wheel pressing on the first flexible belt and a support pole connecting with the pressure wheel.

4. The robot arm system of claim 2, further comprising a second pre-tighten assembly pressing against the second flexible belt.

5. The robot arm system of claim 1, wherein the first drive mechanism comprises a first motor, a first worm, and a first worm gear, the first motor is positioned on the support base and drives the first worm to rotate, and the first worm meshes with the first worm gear, thereby driving the first robot arm to rotate around the first rotation axis.

6. The robot arm system of claim 5, wherein the first worm gear forms a first torque adjusting portion being a protrusion offset from the first rotation axis, to offset a load torque effect of the robot arm system.

7. The robot arm system of claim 1, wherein the second drive mechanism comprises a second motor, a second worm, a second worm gear, a belt transmission assembly, the second motor is positioned on the support base and drives the second worm to rotate, the second worm meshes with the second worm gear, and the belt transmission assembly connects the second worm gear to the second worm, thereby driving the second robot arm to rotate around the second rotation axis.

8. The robot arm system of claim 7, wherein the second worm gear forms a first torque adjusting portion being a protrusion offset from the first rotation axis, to offset a load torque effect of the robot arm system.

9. The robot arm system of claim 1, wherein the first wheel is positioned on the support base via an a mounting base, the second wheel is positioned on a first end of the second robot arm, and the third wheel is positioned on the wrist assembly, and is rotatably connected to a second end of the second robot arm.

10. The robot arm system of claim 1, further comprising a bottom base rotatably connected to the support base.

11. The robot arm system of claim 10, further comprising a third drive mechanism driving the support base to rotate around a third rotation axis relative to the bottom base, wherein the third drive mechanism comprises a third motor, a first gear, and a second gear, the first gear is meshed with the second gear, and the third motor drives the first gear to rotate.

12. The robot arm system of claim 7, wherein the first flexible belt and the second flexible belt are synchronous belts, or flat belts.

13. The robot arm system of claim 1, wherein a central axis of the first wheel is aligned with the first rotation axis in a straight line, and a central axis of the second wheel is aligned with the second rotation axis in a straight line.

14. A robot arm system, comprising:
a support base;
a first robot arm rotatably connected to the support base;
a first drive mechanism driving the first robot arm to rotate around a first rotation axis relative to the support base;
a second robot arm rotatably connected to the first robot arm;
a second drive mechanism driving the second robot arm to rotate around a second rotation axis relative to the first robot arm; and
a wrist assembly connected to the second robot arm;
a first wheel positioned on the support base;
a second wheel positioned on the second robot arm;
a third wheel positioned on the wrist assembly and rotatably connected to the second robot arm;
a first flexible belt connecting the first wheel with the second wheel; and
a second flexible belt connecting the third wheel with the second wheel;
wherein the first drive mechanism comprises a first motor, a first worm, and a first worm gear, the first motor is positioned on the support base and drives the first worm to rotate, the first worm meshes with the first worm gear, thereby driving the first robot arm to rotate around the first rotation axis, the first wheel is driven by the first worm gear to rotate, an attitude of the second robot arm remains unchanged when the first robot arm rotates relative to the first rotation axis.

15. The robot arm system of claim 14, wherein the first worm gear forms a first torque adjusting portion being a protrusion offset from the first rotation axis, to offset a load torque effect of the robot arm system.

16. The robot arm system of claim 14, wherein the second drive mechanism comprises a second motor, a second worm, a second worm gear, a belt transmission assembly, the second motor is positioned on the support base and drives the second worm to rotate, the second worm meshes with the second worm gear, and the belt transmission assembly connects the second worm gear to the second worm, thereby driving the second robot arm to rotate around the second rotation axis.

17. The robot arm system of claim 16, wherein the second worm gear forms a first torque adjusting portion being a protrusion offset from the first rotation axis, used to offset the effect of a load torque of the robot arm system.

18. The robot arm system of claim 14, further comprising a bottom base rotatably connected to the support base.

19. The robot arm system of claim 18, further comprising a third drive mechanism driving the support base to rotate around a third rotation axis relative to the bottom base, the third drive mechanism comprises a third motor, a first gear, and a second gear, the first gear is meshed with the second gear, and the third motor drives the first gear to rotate.

* * * * *